United States Patent
Rosu

(10) Patent No.: US 11,782,127 B2
(45) Date of Patent: Oct. 10, 2023

(54) STOP CRITERION FOR GREEDY TARGET DETECTION ALGORITHMS IN RADAR APPLICATIONS USING SPARSE PHASED ARRAYS

(71) Applicant: NXP USA, Inc., Austin, TX (US)

(72) Inventor: Filip Alexandru Rosu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 113 days.

(21) Appl. No.: 17/226,397

(22) Filed: Apr. 9, 2021

(65) Prior Publication Data

US 2022/0252696 A1 Aug. 11, 2022

(30) Foreign Application Priority Data

Feb. 5, 2021 (RO) .............. RU2021 00035

(51) Int. Cl.
*G01S 7/35* (2006.01)
*G01S 7/41* (2006.01)

(52) U.S. Cl.
CPC . *G01S 7/41* (2013.01); *G01S 7/35* (2013.01)

(58) Field of Classification Search
CPC .... G01S 7/41; G01S 13/42; G01S 2013/0245; G01S 7/35; G01S 7/354
See application file for complete search history.

(56) References Cited

U.S. PATENT DOCUMENTS

| 6,240,183 | B1 | 5/2001 | Marchant |
| 6,819,766 | B1 | 11/2004 | Weidong |
| 7,472,285 | B2 | 12/2008 | Graunke et al. |
| 7,936,870 | B2 | 5/2011 | Hauge et al. |
| 9,152,577 | B2 | 10/2015 | Rodgers et al. |
| 9,152,814 | B1 | 10/2015 | Natanzon |
| 9,792,448 | B2 | 10/2017 | Kaplan et al. |
| 9,954,681 | B2 | 4/2018 | Case et al. |
| 10,157,153 | B2 | 12/2018 | Shacham et al. |

(Continued)

FOREIGN PATENT DOCUMENTS

| CN | 105761223 A | * | 7/2016 | |
| CN | 105974358 A | * | 9/2016 | ............... G01S 3/14 |

(Continued)

OTHER PUBLICATIONS

Cai et al. "Orthogonal Matching Pursuit for Sparse Signal Recovery With Noise", IEEE Transactions on Information Theory, vol. 57, No. 7, Jul. 2011, pp. 4680-4688.

(Continued)

*Primary Examiner* — Kyle R Quigley
*Assistant Examiner* — Christine Y Liao

(57) ABSTRACT

Various embodiments relate to a method and system for stopping a target detection greedy algorithm used in a radar system having a sparse array, including: running an iteration of the target detection greedy algorithm on signals received by the sparse array; adding a complex DC component to a residue produced by the target detection greedy algorithm; estimating the variance of the noise in the received signal; testing a first null hypothesis using the estimate of the variance of noise in the received signal and the average of the square magnitude of the complex data of the received signal; and stopping the target detection greedy algorithm when the first null hypothesis test passes.

16 Claims, 9 Drawing Sheets

(56) References Cited

U.S. PATENT DOCUMENTS

| | | | |
|---|---|---|---|
| 10,261,919 B2 | 4/2019 | Ndu et al. | |
| 10,749,672 B2 | 8/2020 | Lee et al. | |
| 2002/0146118 A1 | 10/2002 | DiSanto et al. | |
| 2008/0129560 A1* | 6/2008 | Baraniuk | G06K 9/6232 |
| | | | 341/87 |
| 2008/0228446 A1* | 9/2008 | Baraniuk | G06V 10/7715 |
| | | | 702/189 |
| 2011/0154061 A1 | 6/2011 | Chilukuri et al. | |

FOREIGN PATENT DOCUMENTS

| | | |
|---|---|---|
| CN | 107563226 A | 1/2018 |
| JP | 6033741 B2 | 11/2016 |

OTHER PUBLICATIONS

Kallummil et al. "Tuning Free Orthogonal Matching Pursuit", Cornell University, 13 pgs., retrieved from the internet at: https://arxiv.org/abs/1703.05080 (Mar. 15, 2017).

Liang et al. "Theoretical stopping criteria guided Greedy Algorithm for Compressive Cooperative Spectrum Sensing", Computer Communications 111, pp. 165-175 (2017).

Chang et al. "Orthogonal Matching Pursuit with a Normalized Residual Based Stopping Criterion", IJAEEE, vol. 8, Issue 1, Dec. 27, 2019, 3 pages.

Yang et al. "Orthogonal Matching Pursuit with Thresholding and its Application in Compressive Sensing", IEEE, Jul. 2, 2015; 17 pgs.

* cited by examiner

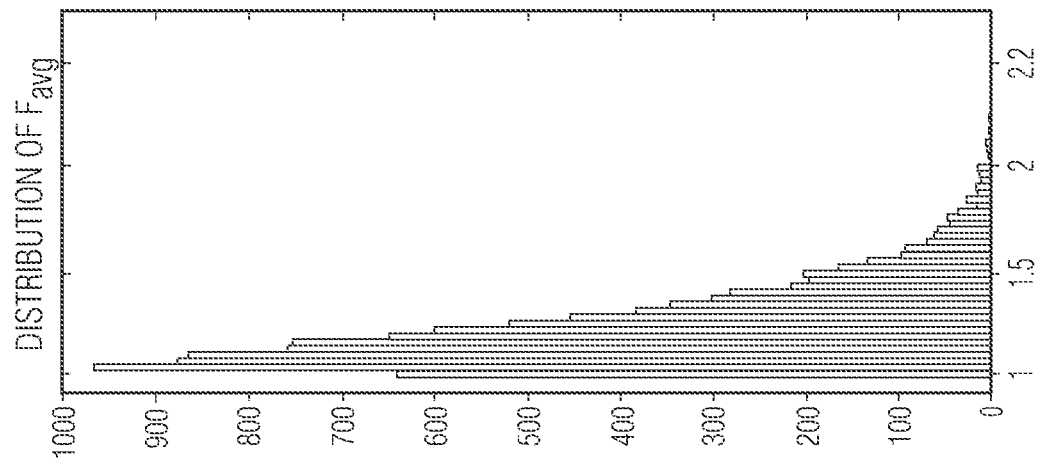
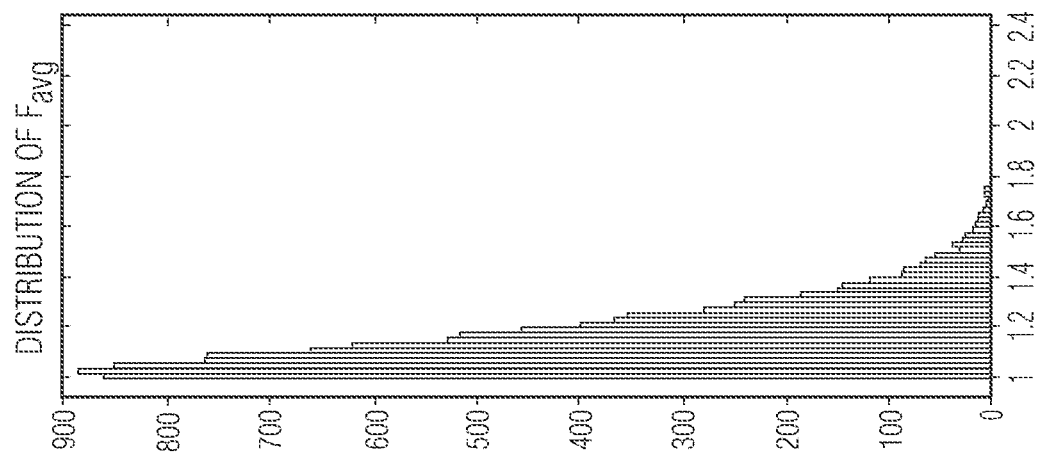

STOP CRITERION FOR GREEDY TARGET DETECTION ALGORITHMS IN RADAR APPLICATIONS USING SPARSE PHASED ARRAYS

TECHNICAL FIELD

Various exemplary embodiments disclosed herein relate generally to stop criterion for greedy target detection algorithms in radar applications.

BACKGROUND

The Frequency Modulation Continuous Wave (FMCW) Fast Chirp Modulation (FCM) radars used in the automotive industry represent a primary sensor in many Advanced Driver Assistance System (ADAS) and play an important role in autonomous driving (AD) systems as a safety sensor. Constrained by the limited angular resolution performance, existing automotive radars are not used as the primary sensor in AD systems. To improve the radar's angular resolution capability, a larger antenna aperture is usually needed. Using large Uniform Linear Arrays (ULA) is costly, as each element in the phased array requires its very own receive channel (low noise amplifier (LNA), down-conversion mixer, amplifiers, analog-to-digital converters (ADC), etc.). A solution to this problem is using sparse phased arrays. The compromise is that sparse phased arrays require special processing to eliminate the artefacts caused by the sparsification. Greedy target detection algorithms present a valid solution for detecting targets when a sparse antenna array is used, and come in many different flavors, such as MP, OMP, to name a few.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for stopping a target detection greedy algorithm used in a radar system having a sparse array, including: running an iteration of the target detection greedy algorithm on signals received by the sparse array; adding a complex DC component to a residue produced by the target detection greedy algorithm; estimating the variance of the noise in the received signal; testing a first null hypothesis using the estimate of the variance of noise in the received signal and the average of the square magnitude of the complex data of the received signal; and stopping the target detection greedy algorithm when the first null hypothesis test passes.\

Various embodiments are described, further comprising repeating the steps of: running an iteration of the target detection greedy algorithm on signals received by the sparse array; adding a complex DC component to a residue produced by the target detection greedy algorithm; estimating the variance of the noise in the received signal; testing a first null hypothesis using the estimate of the variance of noise in the received signal and the average of the square magnitude of the complex data of the received signal; and stopping the target detection greedy algorithm when the first null hypothesis test passes claim 1; when the first null hypothesis does not pass.

Various embodiments are described, further including: testing a second null hypothesis using the estimate of the variance of noise in the received signal and the variance of the square magnitude of the complex data of the received signal; and stopping the target detection greedy algorithm when the second null hypothesis test passes.

Various embodiments are described, wherein the first null hypothesis test includes an F test that compares a threshold $F_{avg}$ to a ratio based upon the mean of the noise distribution and the variance of the noise, and the second test null hypothesis test includes an F test that compares a threshold $F_{var}$ to a ratio based upon the variance of the noise distribution and the variance of the noise.

Various embodiments are described, further including: estimating the variance of the received signal; and running a next iteration of the target detection greedy algorithm on signals received by the sparse array when the variance of the signal is less than the variance of the noise.

Various embodiments are described, wherein the variance of the noise is estimated based on average of the magnitude of the complex data of the received signal and the variance of the magnitude of the complex data of the received signal.

Various embodiments are described, wherein the complex DC component is at least 100 times greater than the largest detected complex amplitude in the signal.

Various embodiments are described, wherein the complex DC component is at least 10 times greater than the largest detected complex amplitude in the signal.

Various embodiments are described, wherein the variance of the received signal is estimated based on the average of the magnitude of the complex data of the received signal and the variance of the magnitude of the complex data of the received signal.

Further various embodiments relate to a method for stopping a target detection greedy algorithm used in a radar system having a sparse array, including: running an iteration of the target detection greedy algorithm on signals received by the sparse array; adding a complex DC component to a residue produced by the target detection greedy algorithm; estimating the variance of the noise in the received signal; testing a first null hypothesis using the estimate of the variance of noise in the received signal and the average of the square magnitude of the complex data of the received signal; testing a second null hypothesis using the estimate of the variance of noise in the received signal and the variance of the square magnitude of the complex data of the received signal; and stopping the target detection greedy algorithm when the first null hypothesis test passes and the second null hypothesis test passes.

Further various embodiments relate to a radar system having a sparse array, including: a sparse antenna array including a plurality of antennas and associated receivers; a processor configured to: run an iteration of a target detection greedy algorithm on signals received by the sparse array; add a complex DC component to a residue produced by the target detection greedy algorithm; estimate the variance of the noise in the received signal; test a first null hypothesis using the estimate of the variance of noise in the received signal and the average of the square magnitude of the complex data of the received signal; and stop the target detection greedy algorithm when the first null hypothesis test passes.

Various embodiments are described, wherein the processor is further configured to: test a second null hypothesis using the estimate of the variance of noise in the received signal and the variance of the square magnitude of the complex data of the received signal; and stop the target detection greedy algorithm when the second null hypothesis test passes.

Various embodiments are described, wherein the processor is further configured to: estimate the variance of the received signal; and run a next iteration of the target detection greedy algorithm on signals received by the sparse array when the variance of the signal is less than the variance of the noise.

Various embodiments are described, wherein estimating the variance of the received signal includes calculating:

$$\sigma_s^2 = \sqrt{M^2 - V},$$

where $\sigma_s^2$ is the variance of the received signal, M is the average of the square magnitude of the complex data of the received signal, and V is the variance of the square magnitude of the complex data of the received signal.

Various embodiments are described, wherein the complex DC component is at least 100 times greater than the largest detected complex amplitude in the signal.

Various embodiments are described, wherein the complex DC component is at least 10 times greater than the largest detected complex amplitude in the signal.

BRIEF DESCRIPTION OF THE DRAWINGS

In order to better understand various exemplary embodiments, reference is made to the accompanying drawings, wherein:

FIG. 4 illustrates an example of a histogram of $F_{avg}$ generated using a Monte-Carlo simulation;

FIG. 5 illustrates an example of a histogram of $F_{var}$, generated using a Monte-Carlo simulation;

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Target detection algorithms may be used to detect multiple targets in radar systems using sparse antenna arrays. An example of such target detection algorithms are greedy algorithms that help to reduce artifacts caused by sparse arrays. A known issue of greedy algorithms used to reduce artifacts is choosing a stop criterion, as each iteration is equivalent to the detection of one target. Optimally, the algorithm stops after all targets have been detected, but if the stop criterion is not properly chosen, the algorithm will either detect too few or too many targets. Embodiments of an efficient and accurate greedy target detection algorithm stop criterion will be described herein.

Figure 1:
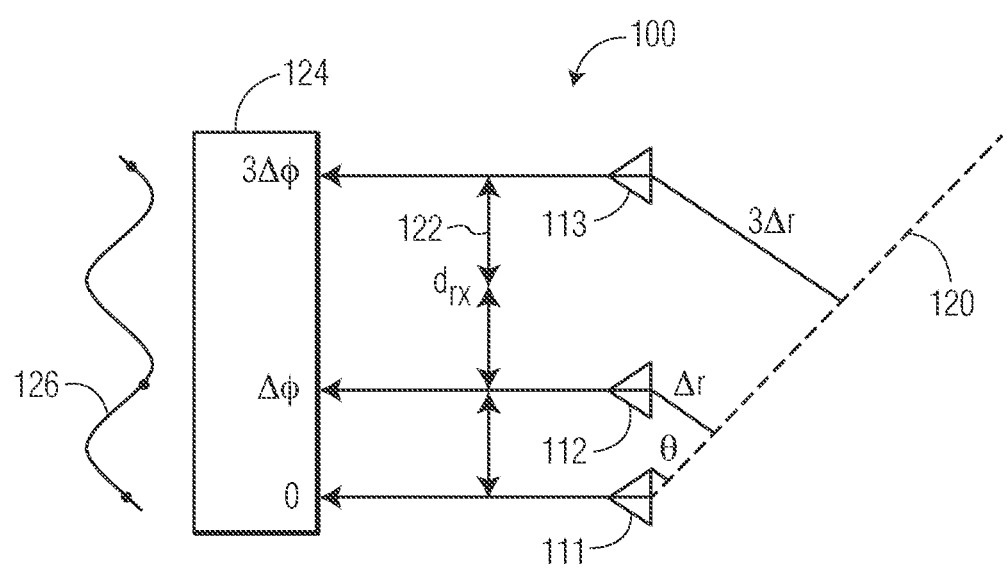
FIG. 1 illustrates the operation of a sparse antenna array.

FIG. 1 illustrates the operation of a sparse antenna array. The sparse antenna array 100 includes in this simple example of four antennas or elements 111-113. More elements may be used and the antenna array may also be a two dimensional grid. Each element 111-113 in the sparse antenna array 100 includes its very own receive channel, which may include a low noise amplifier (LNA), down-conversion mixer, amplifiers, analog-to-digital converters (ADC), etc. The output of each element may be a digital signal. A target may reflect a signal the causes a wavefront 120 to impinge upon the elements 111-113. This target is at an angle θ from the normal direction of the sparse antenna array 100. The target is as slightly different ranges from each element 111-113 in the sparse antenna array 100, which leads to incrementing differences in range of Δr and 3Δr. The value Δr may be calculated as:

$$\Delta r = d_{Rx} \sin(\theta),$$

where $d_{Rx}$ is the spacing between elements 111-113. This range difference leads to a phase difference Δφ 124 in the signal received at each element 111-113, which may be calculated as $$\Delta \varphi = \frac{2\pi}{\lambda} \Delta r,$$

where λ is the wavelength of the received signal. Across the elements 111-113 the phase difference will vary sinusoidally as shown by 126.

This fact may be utilized to detect targets, as each target will have a different phase response based upon target angle. Accordingly, a fast Fourier transform (FFT) may be applied to samples of the phase difference samples x(n)=A cos(Δφn). Targets will show as distinct peaks at the output of the FFT.

Because the sparse antenna array causes grating lobes or aliasing, compressive techniques such as greedy algorithms such as orthogonal matching pursuit (OMP) may be used detect targets. So a target may be detected such as the first target a at 0°. The algorithm estimates how the signal would appear if it were not sparse. This signal estimate is subtracted from the received signals leaving a residue, where the first target at 0° has been removed. This process may then be repeated for other peaks in the residue until there are no more targets. The challenge is determining when there are no more target left. Various prior approaches may compare the total energy in the residue to an arbitrary threshold to determine that no targets are left in the residue. These approaches do not work well in practice because of the dynamic range of the input and other variables in the system. Similar steps are followed in matching pursuit (MP) or other greedy or compressive algorithms.

Various embodiments of a stop method for greedy algorithms used in sparse antenna array radar systems will now be described. These embodiments make use of the received signal's higher order statistics to evaluate its probability density function and compare it to an a priori known distribution. This is done by first estimating the noise parameters via a novel technique which is then used in a non-parametric F-test (variance ratio test). If the null hypothesis is accepted, the greedy algorithm stops.

First a theoretical description will be provided. The received spatial signal, used for direction of arrival (DoA) estimation, is modelled as:

$$s_n + w_n, \quad (1)$$

where $s_n$ is the desired signal, represented by a series of complex harmonics with constant magnitude, and $w_n$ is Additive White Gaussian Noise (AWGN), with zero mean and variance $\sigma_w^2$ meaning that both real and imaginary components are AWGN with zero mean and variance $\sigma_w^2/2$. The embodiments address the topic of solving DoA for sparse arrays, using greedy algorithms, more specifically, the problem of finding an optimal stop criterion.

First, the square magnitude of data is analyzed:

$$|s_n + w_n|^2 = (s_n + w_n)(s_n + w_n)^* \quad (2)$$

$$|s_n + w_n|^2 = |s_n|^2 + |w_n|^2 + 2Re\{s_n w_n\} \quad (3)$$

The first right-hand term of equations (3) represents a constant, and depends solely on the received signal power. The second term represents an exponentially distributed RV, which depends solely on noise power. The exponential power density function (PDF) is shown below:

$$f_E(x; \lambda) = \frac{1}{\lambda} \exp\left(-\frac{x}{\lambda}\right) \quad (4)$$

The third term is twice the real part of the product between the received signal, which is unknown but deterministic, and the IQ receiver noise, which is a Gaussian RV. The Gaussian PDF is shown below:

$$f_G(x; \mu, \sigma) = \frac{1}{\sqrt{2\pi\sigma^2}} \exp\left(-\frac{1}{2} \frac{(x-\mu)^2}{\sigma^2}\right) \quad (5)$$

In short, this analysis shows that squared magnitude of the received data includes the summation of three terms: two random variables and an unknown deterministic component. For now, two simplifications will be made: first that the signal has constant magnitude; and second that all cross-correlation terms are negligible between the terms in equation (3). The fact that the resulting PDF of adding two independent random variables is the convolution of their pdfs will be used, where convolution is denoted by the symbol "*", as follows:

$$Z_{EMG} = X_E + Y_G \quad (6)$$

$$f_{EMG}(z) = f_E(x) * f_G(Y) = \int f_E(t) f_G(z-t) dt \quad (7)$$

This means that the PDF of $|s_n w_n|^2$ is obtained by convolving an exponential distribution, depending on $|w_n|^2$, and a Gaussian distribution, depending on $2Re\{s_n w_n\} + |s_n|^2$. The resulting distribution is called an Exponentially Modified Gaussian (EMG), and has the following PDF:

$$f_{EMG}(z; \lambda, \mu, \sigma) = \frac{\lambda}{2} \exp\left(\frac{\lambda}{2}(2\mu + \lambda\sigma^2 - 2z)\right) \text{erfc}\left(\frac{\mu + \lambda\sigma^2 - z}{\sqrt{2\sigma^2}}\right) \quad (8)$$

where $$\text{erfc}(\zeta) = 1 - \frac{2}{\sqrt{\pi}} \int_0^\zeta \exp(-t^2) dt$$

is the Complementary Error Function.

It is clear that the EMG PDF is fully characterized by three parameters, $\lambda$, $\mu$, $\sigma$. What remains is to estimate the parameters from the data, normalize the PDF, and find a closed form solution for the Probability of False Alarm.

Figure 2A:
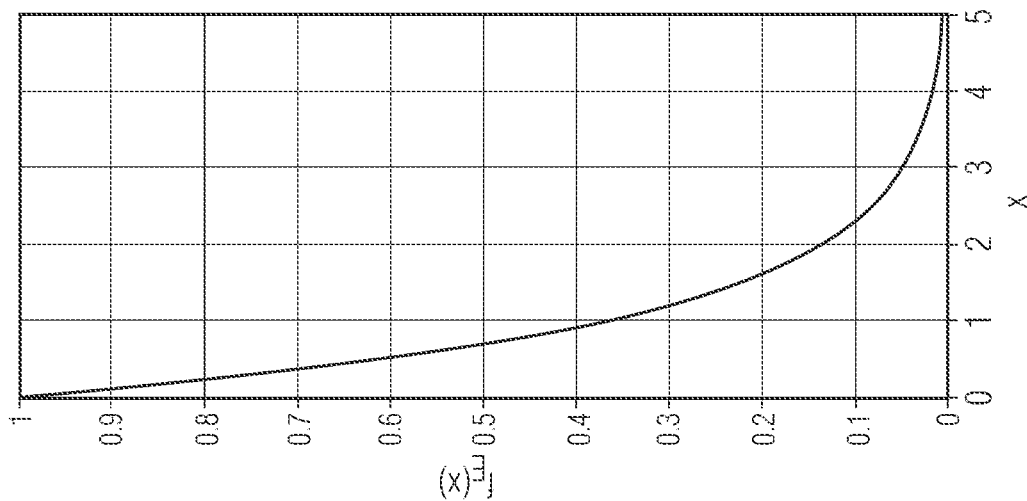
FIG. 2A illustrates a histogram of the first term in equation (2)
Figure 2B:
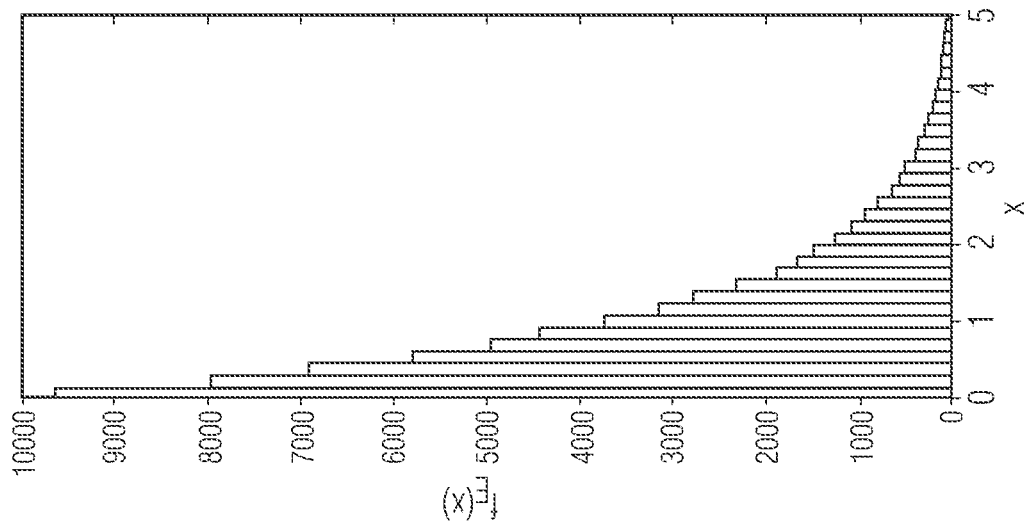
FIG. 2B illustrates an estimated PDF of the first term in equation (2)
Figure 2C:
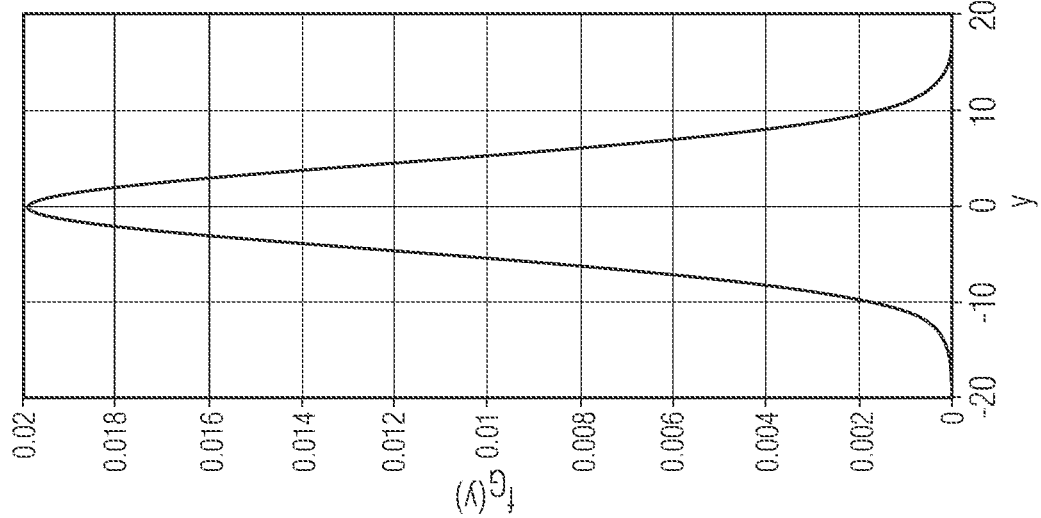
FIG. 2C illustrates a histogram of the second term in equation (2)
Figure 2D:
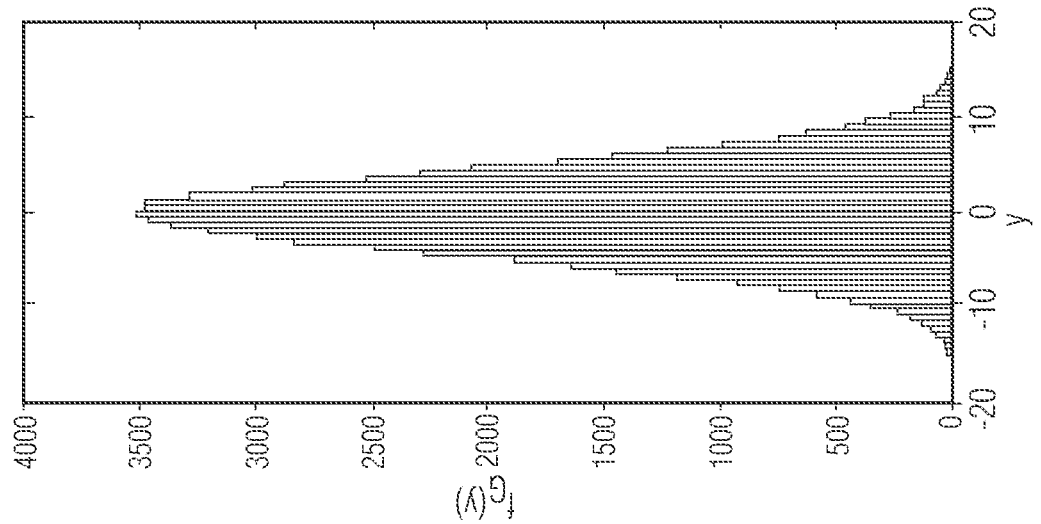
FIG. 2D illustrates an estimated PDF of the second term in equation (2)
Figure 2F:
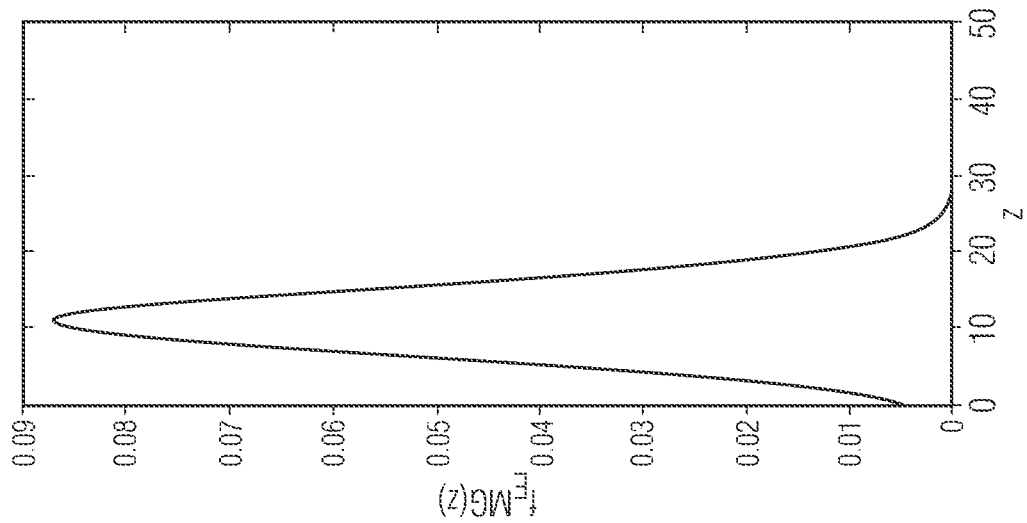
FIG. 2F illustrates an estimated PDF of the resulting distribution of equation (2)
Figure 2E:
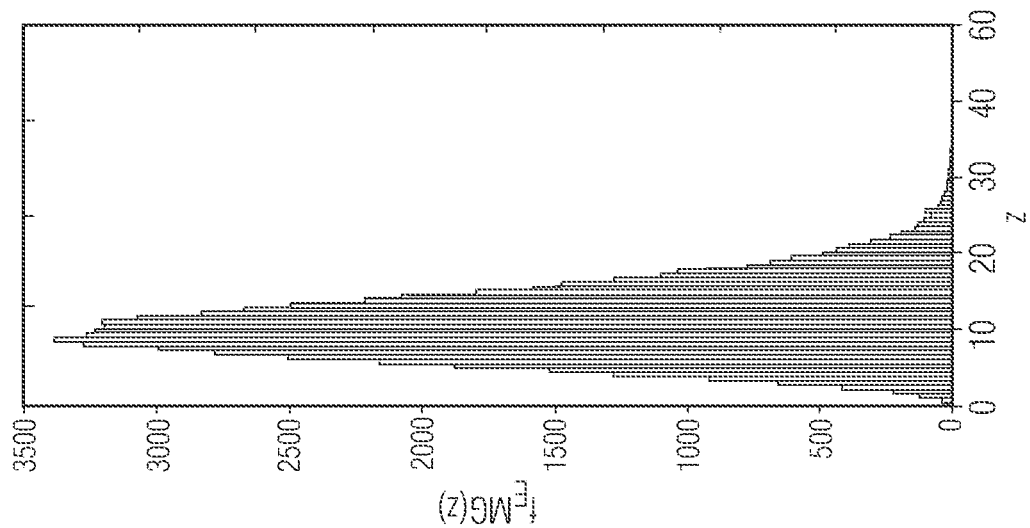
FIG. 2E illustrates a histogram of the resulting distribution of equation (2)

FIGS. 2A and 2B illustrate the distribution of the first term in equation (2). FIG. 2A is a histogram of the first term in equation (2), and FIG. 2B is an estimated PDF of the first term in equation (2). FIGS. 2C and 2D illustrate the distribution of the second term in equation (2). FIG. 2C is a histogram of the second term in equation (2), and FIG. 2D is an estimated PDF of the second term in equation (2). FIGS. 2E and 2F illustrate the distribution of the resulting distribution of the equation (2) as detailed in equation (8). FIG. 2E is a histogram of the resulting distribution of equation (2), and FIG. 2F is an estimated PDF of the resulting distribution of equation (2). FIGS. 2A-2F provide insight to the distribution of the received signal that will be further explored below.

Figure 3A:
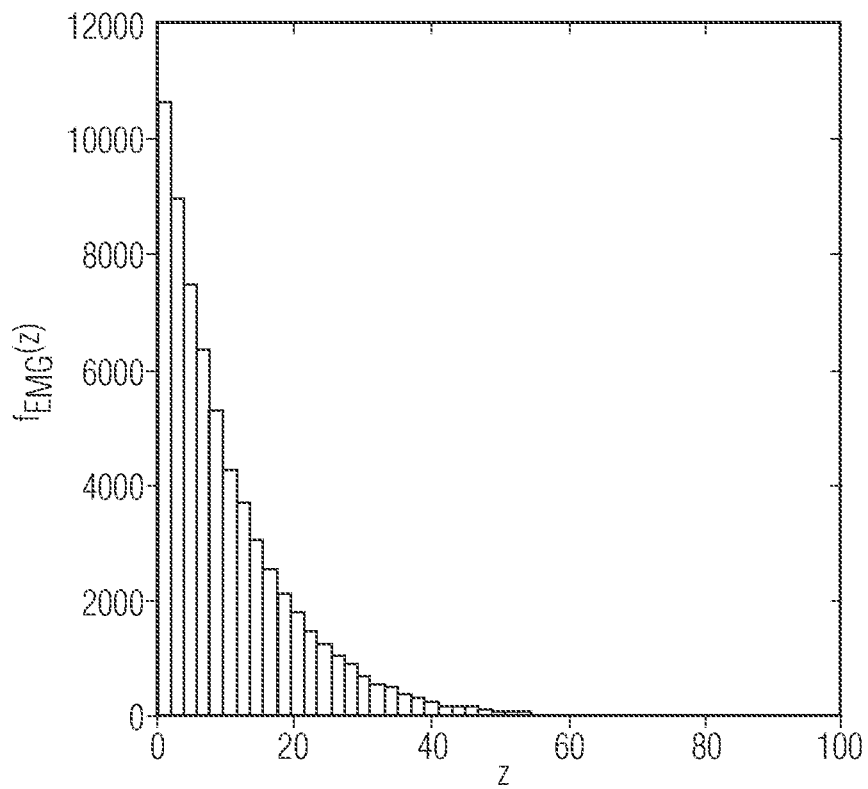
FIGS. 3A to 3D illustrate the evolution of the EMG PDF of equation (8) as a function of signal to noise ratio (SNR)
Figure 3B:
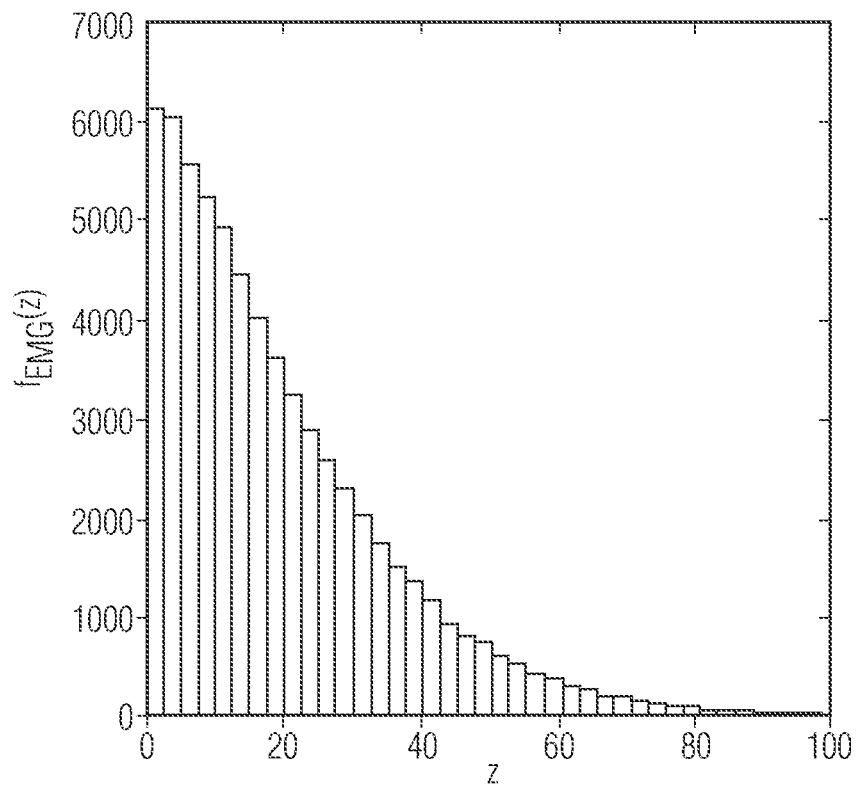
Figure 3C:
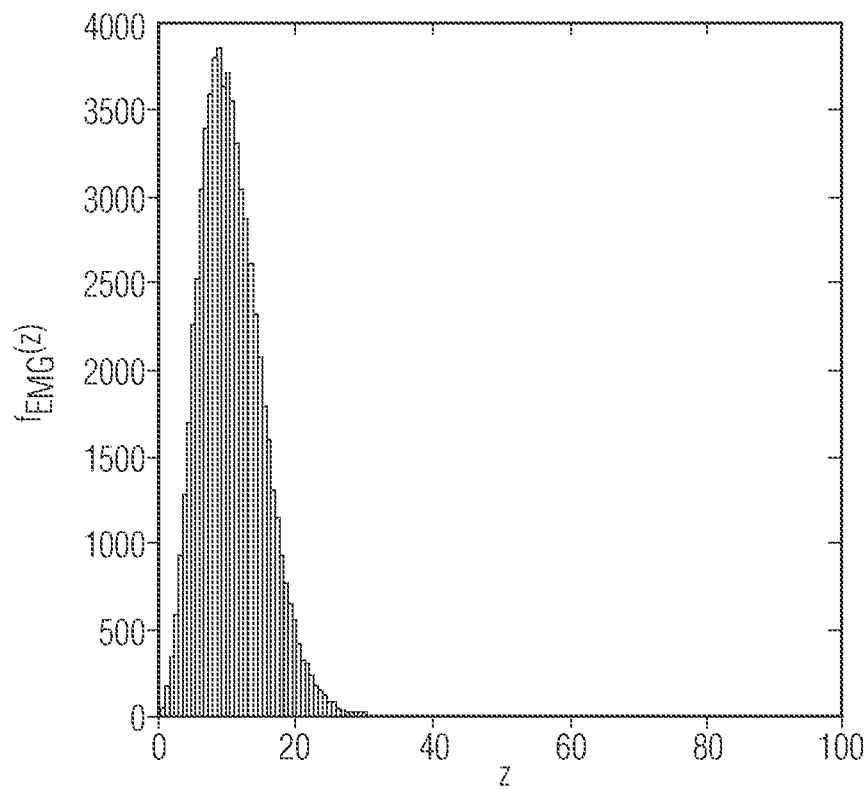
Figure 3D:
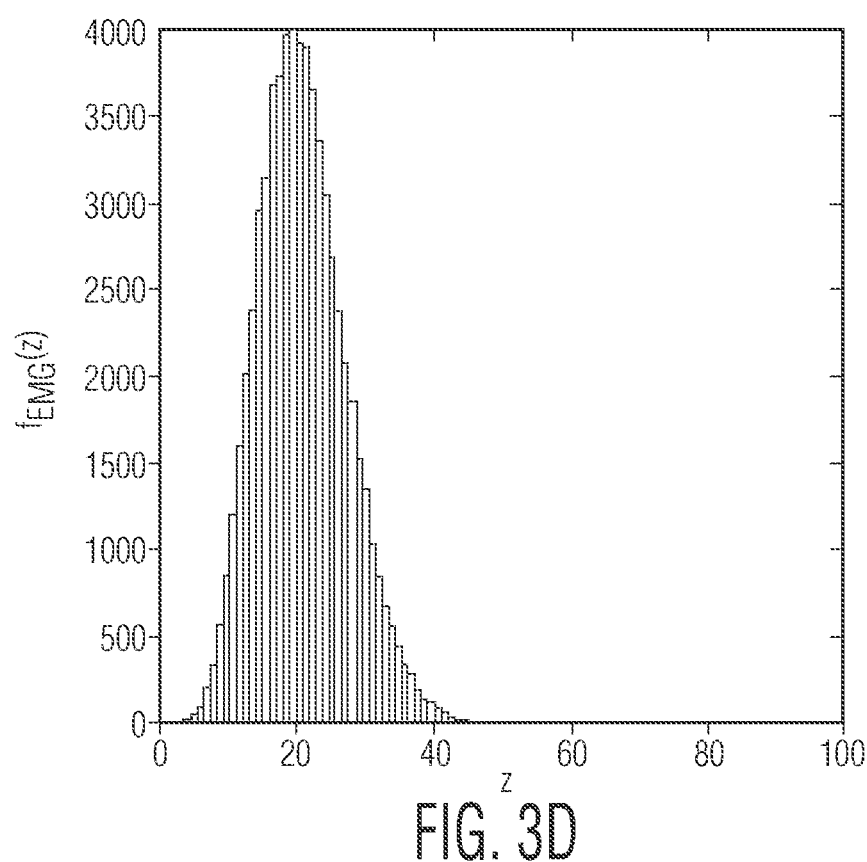

FIGS. 3A to 3D illustrate the evolution of the EMG PDF of equation (8) as a function of signal to noise ratio (SNR) as follows; in FIG. 3A, $\sigma_w^2 = 10$ and $\sigma_s^2 = 1$; in FIG. 3B, $\sigma_w^2 = 10$ and $\sigma_s^2 = 10$; in FIG. 3C, $\sigma_w^2 = 1$ and $\sigma_s^2 = 10$; and in FIG. 3D, $\sigma_w^2 = 1$ and $\sigma_s^2 = 20$. As can be seen in FIGS. 3A and 3B, at low SNR the PDF may be modelled as an exponential distribution. As can be seen in FIGS. 3C and 3D, at high SNR, the PDF may be modelled as a Gaussian distribution. The characteristics shown in FIGS. 2A to 2F and FIGS. 3A to 3D may be used to develop a method for stopping the greedy algorithm.

The first step is to estimate the three parameters of the EMG PDF. It is convenient to link the three parameters $\lambda$, $\mu$, $\sigma$ to some physical properties of the data. The average and the variance of equation (2), respectively, are defined as shown below:

$$E\{D\} = \frac{1}{\lambda} + \mu \quad (9a)$$

$$E\{(D - E\{D\})^2\} = \sigma^2 + \frac{1}{\lambda^2} \quad (9b)$$

where $E\{D\}$ is the average of D, $E\{D^2 - E\{D\}\}$ represents the variance of D, and D is the square magnitude of the complex (IQ) data, as presented in equation (2). The three EMG parameters are the exponential PDF variable $\lambda$, and the two Gaussian pdf variables, $\mu$ and $\sigma^2$, which become:

$$\frac{1}{\lambda} = \sigma_w^2 \quad (10a)$$

$$\mu = \sigma_s^2 \quad (10b)$$

$$\sigma^2 = 2\sigma_w^2\sigma_s^2 + \sigma_w^4 \quad (10c)$$

Using notations $M=E\{D\}$, $V=E\{(D-E\{D\})^2\}$, and inserting equations (10) into equations (9) results in a quadratic system, that has the following unique solution:

$$\sigma_w^2 = M - \sqrt{M^2 - V} \quad (11a)$$

$$\sigma_s^2 = \sqrt{M^2 - V} \quad (11b)$$

Hitherto, it is shown that the three parameters are separable, and can be efficiently estimated from the data. First, the average and variance of D are computed, which are then used to estimate $\sigma_w^2$ and $\sigma_s^2$.

There are, however, two major issues that need to be addressed. First, it has been observed that SNR has a major impact on the numerical sensitivity of the system described by equations (11). For SNR values below 0 the errors are simply too large to obtain any relevant estimates. However, DoA estimation is done after Range-Doppler processing which is generally followed by constant false alarm rate (CFAR) detection. This means that the SNR is at least 10 dB, (generally 15 dB), so that this issue may be neglected. The second issue is that the signal magnitude is not a DC constant as previously assumed, meaning that the equation system above does not hold. As more and more targets are present, the signal's dynamic range increases and cannot be modelled as a constant. This problem is solved by the embodiments described herein within the greedy algorithm: if the signal cannot be modelled as a constant, there will be a large discrepancy between variance and squared mean, meaning that the algorithm will not reach a stop, and will continue to next iteration. Every iteration a complex exponential is removed from the residue r and replaced with a constant DC term, thus incrementally improving the estimate of $\sigma_w^2$, up to the point when there is a single target left, whose magnitude is a DC component.

The data is not normally distributed; hence the classic F-test, T-test, or Z-test cannot be applied. A widely used non-parametric test is the Kolmogorov-Smirnov test, but this test is too computationally exhaustive.

Embodiments are described that teach how to construct a hypothesis test based on the fact that if no signal is present, the noise has a pure exponential distribution, with mean $M=\sigma_w^2$ and variance $V=\sigma_w^4$. Unfortunately, due to the large skewness of the exponential distribution, if only a few samples (receivers) are used, say <100, the variance estimate is not as accurate, so a different threshold will be used, based on a pre-computed probability table that may be calculated off-line. The whole table is not needed during operation of the stop method, but only the value of interest.

The null hypothesis, $H_0$, is that the variance of the residue is equal to $\sigma_w^4$, as in equation (12a) below, and so is the squared mean as in equation (12b) below. A non-parametric F-like test may be used to test this hypothesis, and for a given confidence level, decide if the hypothesis may or may not be rejected. The hypothesis will be rejected or accepted based on the inequalities shown below. The variance ratios of equation (12a) and equation (12b) will also be treated as a random variable, with a distribution which depends solely on the number of samples.

The first F test includes comparing the square of the mean with the reference noise variance as follows:

$$\max\left\{\frac{M}{\sigma_w^2}, \frac{\sigma_w^2}{M}\right\} < F_{avg} \quad (12a)$$

The second F test includes comparing the variance with the reference noise variance as follows:

$$\max\left\{\frac{\sqrt{V}}{\sigma_w^2}, \frac{\sigma_w^2}{\sqrt{V}}\right\} < F_{var} \quad (12b)$$

The reason the max function is applied is to obtain a right-tailed distribution of the variance ratio, which is easier to work with. If either or if both tests are passed, then the greedy algorithm ends. The confidence level is set by the values of $F_{avg}$ and $F_{var}$. The F values are chosen as follows: Generate an exponentially distributed noise signal with N samples, where N is the number of antennas, and known variance. Do at least 100 N Monte-Carlo simulation to find:

$$F_{avg} = \max\left\{\frac{M}{\sigma_w^2}, \frac{\sigma_w^2}{M}\right\} \text{ and } F_{var}, = \max\left\{\frac{\sqrt{V}}{\sigma_w^2}, \frac{\sigma_w^2}{\sqrt{V}}\right\},$$

where $\sigma_w^2$ is now replaced with the known variance used to generate the signal. Plot the histogram of $F_{avg}$ and $F_{var}$ and select the values that satisfy the desired confidence interval. FIG. 4 illustrates an example of a histogram of $F_{avg}$ generated using a Monte-Carlo simulation. FIG. 5 illustrates an example of a histogram of $F_{var}$ generated using a Monte-Carlo simulation.

Figure 6:
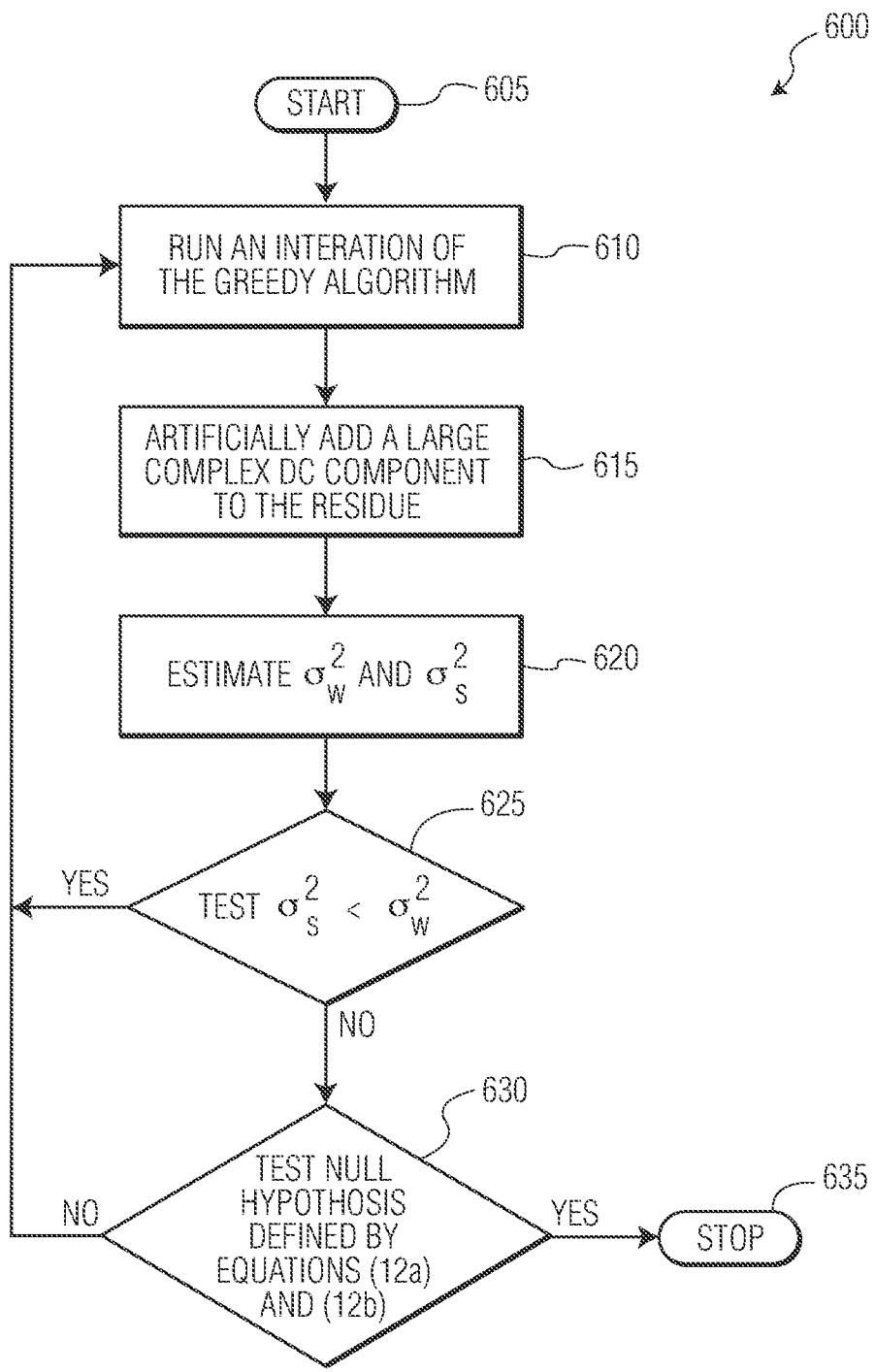
FIG. 6 illustrates a flow diagram of the stop method.

FIG. 6 illustrates a flow diagram of the stop method. The stop method 600 begins at 605. The stop method 600 then runs an iteration of the greedy algorithm 610, e.g., OMP. Next, the stop method artificially enhances the SNR by adding a large complex DC component to the residue 615. This complex DC component may be at least 100 times larger than the first and/or largest detected complex amplitude. In other embodiments this complex DC component may be at least 10 times larger. This step is counter-intuitive, but accomplishes its purpose of improving accuracy of equation (11a). This may be calculated as follows:

$$D = |DC + r|^2,$$

where D is a vector used for further processing based upon the residue, r is the residue, and DC is the large complex DC component.

Next, the stop method 600 then estimates $\sigma_w^2$ from vector D using equation (11a) and $\sigma_s^2$ from $|r|^2$ using equation (11b) 620. The stop method 600 then tests whether $\sigma_s^2 < \sigma_w^2$ 625. If $\sigma_s^2 < \sigma_w^2$, then the stop method continues to step 630, otherwise the next greedy algorithm iteration will execute 610. Next, the stop method 600 tests the null hypothesis defined by equations (12a) and (12b) 630. If the null hypothesis is accepted, the stop method 600 stops 635, otherwise, the stop method 600 returns to step 610 to run the next iteration of the greedy algorithm and to repeat steps 610, 615, 620, 625, and 630.

Figure 7:
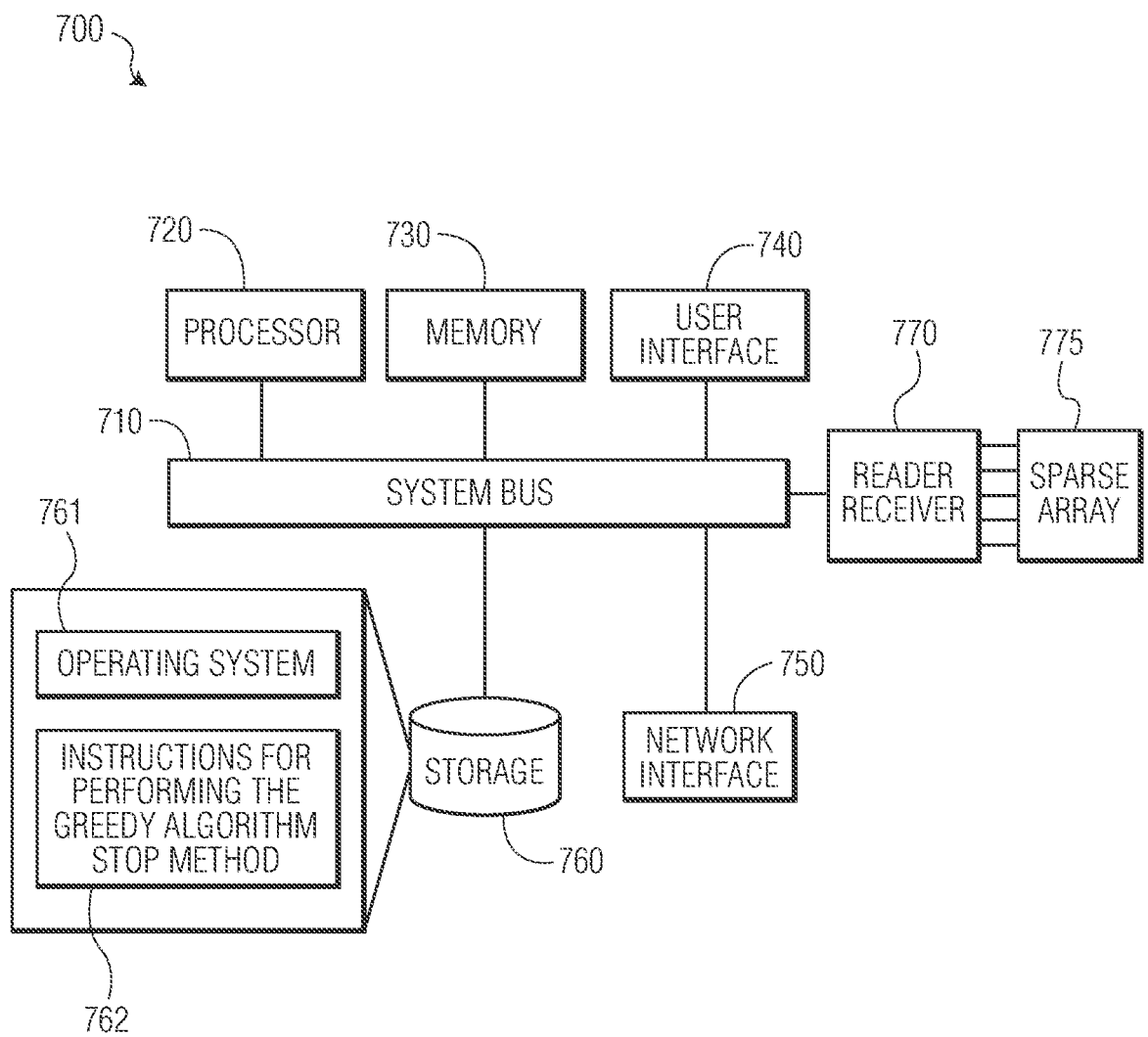
FIG. 7 illustrates an exemplary hardware diagram 700 for implementing the greedy target detection algorithm stop method.

FIG. 7 illustrates an exemplary hardware diagram 700 for implementing the greedy target detection algorithm stop method. As illustrated, the device 700 includes a processor 720, system bus 710, memory 730, user interface 740, network interface 750, and storage 760 interconnected via one or more system buses 710. It will be understood that FIG. 7 constitutes, in some respects, an abstraction and that the actual organization of the components of the device 700 may be more complex than illustrated.

The processor 720 may be any hardware device capable of executing instructions stored in memory 730 or storage 760 or otherwise processing data. As such, the processor may include a microprocessor, microcontroller, graphics processing unit (GPU), field programmable gate array (FPGA), application-specific integrated circuit (ASIC), or other similar devices.

The system bus 710 provides a communication channel between the processor 720, memory 730, user interface 740, storage 760, and network interface 750. The system bus 710 may also be connected to the radar receivers 770 which receive signals from the sparse array 780. In another embodiment the radar receivers 770 may be connected to the network interface 750.

The memory 730 may include various memories such as, for example L1, L2, or L3 cache or system memory. As such, the memory 730 may include static random-access memory (SRAM), dynamic RAM (DRAM), flash memory, read only memory (ROM), or other similar memory devices.

The user interface 740 may include one or more devices for enabling communication with a user as needed. For example, the user interface 740 may include a display, a touch interface, a mouse, and/or a keyboard for receiving user commands. In some embodiments, the user interface 740 may include a command line interface or graphical user interface that may be presented to a remote terminal via the network interface 750.

The network interface 750 may include one or more devices for enabling communication with other hardware devices. For example, the network interface 750 may include a network interface card (NIC) configured to communicate according to the Ethernet protocol or other communications protocols, including wireless protocols. Additionally, the network interface 750 may implement a TCP/IP stack for communication according to the TCP/IP protocols. Various alternative or additional hardware or configurations for the network interface 750 will be apparent.

The storage 760 may include one or more machine-readable storage media such as read-only memory (ROM), random-access memory (RAM), magnetic disk storage media, optical storage media, flash-memory devices, or similar storage media. In various embodiments, the storage 760 may store instructions for execution by the processor 720 or data upon with the processor 720 may operate. For example, the storage 760 may store a base operating system 761 for controlling various basic operations of the hardware 700. The storage 762 may include instructions for implementing the greedy algorithm stop method described above.

It will be apparent that various information described as stored in the storage 760 may be additionally or alternatively stored in the memory 730. In this respect, the memory 730 may also be considered to constitute a "storage device" and the storage 760 may be considered a "memory." Various other arrangements will be apparent. Further, the memory 730 and storage 760 may both be considered to be "non-transitory machine-readable media." As used herein, the term "non-transitory" will be understood to exclude transitory signals but to include all forms of storage, including both volatile and non-volatile memories.

While the host device 700 is shown as including one of each described component, the various components may be duplicated in various embodiments. For example, the processor 720 may include multiple microprocessors that are configured to independently execute the methods described herein or are configured to perform steps or subroutines of the methods described herein such that the multiple processors cooperate to achieve the functionality described herein. Further, where the device 700 is implemented in a cloud computing system, the various hardware components may belong to separate physical systems. For example, the processor 720 may include a first processor in a first server and a second processor in a second server.

The stop method described herein improves the ability of a radar using a sparse array to quickly and efficiently detect all the targets that the radar may see. The stop method improves upon prior stop methods by determining various statistical values from the data and then performing a test based upon the measured statistical values. Further, a large complex DC component may be added to the residue to improve the process. As a result, the stop method embodiments described herein are an improvement over prior stop methods. Reducing the number of iterations of the greedy algorithm is especially important for applications where processing power is limited and real time operation is needed.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for stopping a target detection greedy algorithm used in a radar system having a sparse array, comprising:
   running an iteration of the target detection greedy algorithm on signals received by the sparse array;
   adding a complex direct current (DC) component to a residue produced by the target detection greedy algorithm;
   estimating a variance of the noise in the residue plus complex DC component;
   estimating a variance of the signals received by the sparse array; and
   running a next iteration of the target detection greedy algorithm on signals received by the sparse array in response to the variance of the signals received by the sparse array being less than the variance of the noise;
   estimating a variance of the noise in the residue;
   testing a first null hypothesis using the estimate of the variance of noise in the residue and the average of the residue; and
   stopping the target detection greedy algorithm when the first null hypothesis test passes.

2. The method of claim 1, further comprising repeating the steps of claim 1 when the first null hypothesis does not pass.

3. The method of claim 1, further comprising:
testing a second null hypothesis using the estimate of the variance of noise in the residue and the variance of the residue; and
stopping the target detection greedy algorithm when the second null hypothesis test passes.

4. The method of claim 3, wherein
the first null hypothesis test includes an F test that compares a threshold $F_{avg}$ to a ratio based upon the mean of the noise distribution and the variance of the noise of the residue, and
the second test null hypothesis test includes an F test that compares a threshold $F_{var}$ to a ratio based upon the variance of the noise distribution and the variance of the noise of the residue.

5. The method of claim 1, wherein the complex DC component is at least 100 times greater than the largest detected complex amplitude in the signal.

6. The method of claim 1, wherein the complex DC component is at least 10 times greater than the largest detected complex amplitude in the signal.

7. The method of claim 1, wherein the variance of the noise is estimated based on average of the magnitude of the complex data of the residue and the variance of the magnitude of the complex data of the residue.

8. A method for stopping a target detection greedy algorithm used in a radar system having a sparse array, comprising:
running an iteration of the target detection greedy algorithm on signals received by the sparse array;
adding a complex direct current (DC) component to a residue produced by the target detection greedy algorithm;
estimating a variance of the noise in the residue plus complex DC component;
estimating a variance of signals received by the sparse array; and
running a next iteration of the target detection greedy algorithm on signals received by the sparse array in response to the variance of signals received by the sparse array being less than the variance of the noise;
estimating a variance of the noise in the residue;
testing a first null hypothesis using the estimate of the variance of noise in the residue and the average of the residue;
testing a second null hypothesis using the estimate of the variance of noise in the residue and the variance of the residue; and
stopping the target detection greedy algorithm when the first null hypothesis test passes and the second null hypothesis test passes.

9. The method of claim 8, further comprising repeating the steps of claim 8 when the first null hypothesis and the second null hypothesis do not pass.

10. A radar system having a sparse array, comprising:
a sparse antenna array including a plurality of antennas and associated receivers;
a processor configured to:
run an iteration of a target detection greedy algorithm on signals received by the sparse array;
add a complex direct current (DC) component to a residue produced by the target detection greedy algorithm;
estimate a variance of the noise in the residue plus complex DC component;
estimate a variance of signals received by the sparse array; and
run a next iteration of the target detection greedy algorithm on signals received by the sparse array in response to the variance of signals received by the sparse array being less than the variance of the noise;
estimate a variance of the noise in the residue;
test a first null hypothesis using the estimate of the variance of noise in the residue and the average of the residue; and
stop the target detection greedy algorithm when the first null hypothesis test passes.

11. The radar system of claim 10, wherein the processor is further configured to repeat the processor steps of claim 10 when the first null hypothesis does not pass.

12. The radar system of claim 10, wherein the processor is further configured to:
test a second null hypothesis using the estimate of the variance of noise in the residue and the variance of the residue; and
stop the target detection greedy algorithm when the second null hypothesis test passes.

13. The radar system of claim 12, wherein
the first null hypothesis test includes an F test that compares a threshold $F_{avg}$ to a ratio based upon the mean of the noise distribution and the variance of the noise of the residue, and
the second test null hypothesis test includes an F test that compares a threshold $F_{var}$ to a ratio based upon the variance of the noise distribution and the variance of the noise of the residue.

14. The radar system of claim 10, wherein the complex DC component is at least 100 times greater than the largest detected complex amplitude in the signal.

15. The radar system of claim 10, wherein the complex DC component is at least 10 times greater than the largest detected complex amplitude in the signal.

16. The radar system of claim 10, wherein the variance of the noise is estimated based on average of the magnitude of the complex data of the residue and the variance of the magnitude of the complex data of the residue.

* * * * *